(12) United States Patent
Xiang et al.

(10) Patent No.: US 11,500,650 B2
(45) Date of Patent: Nov. 15, 2022

(54) FPGA UPGRADE METHOD BASED ON PCIE INTERFACE

(71) Applicant: HUAWEI TECHNOLOGIES CO., LTD., Guangdong (CN)

(72) Inventors: Jianbo Xiang, Hangzhou (CN); Bo Zhang, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/339,299

(22) Filed: Jun. 4, 2021

(65) Prior Publication Data

US 2021/0294615 A1 Sep. 23, 2021

Related U.S. Application Data

(63) Continuation of application No. PCT/CN2019/123069, filed on Dec. 4, 2019.

(30) Foreign Application Priority Data

Dec. 5, 2018 (CN) .......................... 201811480823.3

(51) Int. Cl.
*G06F 9/445* (2018.01)
*G06F 8/61* (2018.01)
(Continued)

(52) U.S. Cl.
CPC ............ *G06F 9/44505* (2013.01); *G06F 8/62* (2013.01); *G06F 8/65* (2013.01); *G06F 11/3027* (2013.01);
(Continued)

(58) Field of Classification Search
CPC ....... G06F 9/45558; G06F 13/28; G06F 13/40
See application file for complete search history.

(56) References Cited

U.S. PATENT DOCUMENTS 9,940,123 B1 * 4/2018 Ayoub .................... G06F 8/656
10,031,993 B1 7/2018 Poornachandran et al.
(Continued)

FOREIGN PATENT DOCUMENTS

CN 102053850 A 5/2011
CN 102308281 A 1/2012
(Continued)

OTHER PUBLICATIONS

A. Fernandes et al., "FPGA remote update for nuclear environments," 2015 4th International Conference on Advancements in Nuclear Instrumentation Measurement Methods and their Applications (ANIMMA), 2015, pp. 1-4, doi: 10.1109/ANIMMA.2015.7465564.
(Continued)

*Primary Examiner* — Getente A Yimer
(74) *Attorney, Agent, or Firm* — Womble Bond Dickinson (US) LLP

(57) ABSTRACT

An FPGA upgrade method is provided, including: delivering, by a host, an upgrade instruction to an FPGA; uninstalling a PCIe driver corresponding to the FPGA to let a status of the PCIe link be changed to link down; continuously monitoring, in a first expiration time, whether the status of the PCIe link is changed to link up; and if yes, reloading the PCIe driver. The method further includes: after the FPGA receives the upgrade instruction, continuously monitoring, in a second expiration time, whether the status of the PCIe link is changed to link down, if yes, loading the configuration data from the FPGA configuration memory for upgrade; and after upgrade is completed, negotiating, by the FPGA, with the host to restore the status of the PCIe link to link up that is used for reloading the PCIe driver upon detection by the host.

20 Claims, 14 Drawing Sheets

(51) Int. Cl.
*G06F 8/65* (2018.01)
*G06F 11/30* (2006.01)
*G06F 11/34* (2006.01)
*G06F 13/42* (2006.01)

(52) U.S. Cl.
CPC ........ *G06F 11/3055* (2013.01); *G06F 11/349* (2013.01); *G06F 13/4282* (2013.01); *G06F 2213/0026* (2013.01)

(56) References Cited

U.S. PATENT DOCUMENTS 10,860,357 B1 * 12/2020 Johnson .............. G06F 13/4282
2009/0119659 A1    5/2009 Zou et al.
2015/0143003 A1 * 5/2015 Trout .................... G06F 3/0655
                                                              710/308
2018/0331864 A1 * 11/2018 Das Sharma ........... H04L 27/01
2019/0278586 A1 * 9/2019 Olarig ..................... G06F 8/654

FOREIGN PATENT DOCUMENTS

| CN | 103513994 A | 1/2014 |
| CN | 107038040 A | 8/2017 |
| CN | 107656776 A | 2/2018 |
| CN | 107797816 A | 3/2018 |
| CN | 108400899 A | 8/2018 |

OTHER PUBLICATIONS

Hao Tianqi et al, A Scheme of FPGA Remote Parallel Intelligent Upgrade, 2016, 5 pages.

* cited by examiner

US 11,500,650 B2

FPGA UPGRADE METHOD BASED ON PCIE INTERFACE

CROSS-REFERENCE TO RELATED APPLICATIONS

This application is a continuation of International Application No. PCT/CN2019/123069, filed on Dec. 4, 2019, which claims priority to Chinese Patent Application No. 201811480823.3, filed on Dec. 5, 2018. The disclosures of the aforementioned applications are hereby incorporated by reference in their entireties.

TECHNICAL FIELD

Embodiments relate to the field of communications technologies, and in particular, to a field programmable logic gate array (FPGA) upgrade method based on a peripheral component interconnect express (PCIe) interface.

BACKGROUND

FPGAs (field programmable logic gate arrays) are characterized by a strong processing capability, convenient use, and reconfigurability, and therefore play an important role similar to a coprocessor in an increasing quantity of service scenarios (for example, on a server). Considering versatility, when an FPGA is used as a coprocessor for data acceleration on a host, the FPGA is connected to the host in a form of a standard PCIe interface card in most cases. For example, referring to FIG. 1, FIG. 1 is a schematic structural diagram of connecting a PCIe interface card of a server to a host. An FPGA board 1, an FPGA board 2, a graphics processing board, and a solid state drive in FIG. 1 may all be PCIe interface cards that are connected to the host through PCIe interfaces.

In an operation and maintenance phase, a configuration of the FPGA usually needs to be upgraded. Some complicated or harsh conditions are not suitable for on-site upgrade by personnel, and therefore online FPGA upgrade needs to be performed by using a PCIe bus.

Referring to FIG. 2, in an existing FPGA upgrade method, a dedicated FPGA configuration memory (which is a memory configured to store FPGA configuration data, and is usually a non-volatile memory chip such as a flash memory chip) is added to perform online FPGA upgrade. As an example, a host first writes the configuration data into the FPGA configuration memory through a PCIe interface between the host and the FPGA and an interface (for example, an SPI interface) between the FPGA and the FPGA configuration memory, and then triggers the FPGA to start loading, so that the FPGA reads the data from the FPGA configuration memory through the SPI interface. After loading is completed, the FPGA outputs a reset signal for hot reset of the FPGA. After the reset process ends, a new function of the FPGA can be enabled.

When upgrade is performed by using the foregoing method, because the PCIe interface of the FPGA is unavailable in the loading process, the host may encounter a PCIe link status abnormality and is prone to downtime or restart. To ensure normal running of the host after the FPGA completes loading, the host generally needs to restart. However, this interrupts operation of other PCIe devices (for example, other FPGA boards or the graphics processing board in FIG. 1) and affects a service.

SUMMARY

This application provides an FPGA upgrade method, an FPGA board, a host, and an electronic device, to alleviate a prior-art problem that a service is affected because a host is prone to downtime or restart during an FPGA upgrade process.

According to a first aspect, this application provides an FPGA upgrade method performed jointly by a host and an FPGA. The host is connected to the FPGA through a PCIe link, the FPGA is connected to an FPGA configuration memory, and the FPGA configuration memory stores configuration data required for upgrading the FPGA. The method includes: delivering, by the host, an upgrade instruction to the FPGA; uninstalling, by the host, a PCIe driver corresponding to the FPGA, so that a status of the PCIe link is changed to link down; continuously monitoring, by the host in a first expiration time, whether the status of the PCIe link is changed to link up; and reloading the PCIe driver if it is detected that the status of the PCIe link is changed to link up. The method further includes: after the FPGA receives the upgrade instruction, continuously monitoring, by the FPGA in a second expiration time, whether the status of the PCIe link is changed to link down, where link down is a status of the PCIe link after the host uninstalls the PCIe driver corresponding to the FPGA; if it is detected in the second expiration time that the PCIe link is changed to link down, loading, by the FPGA, the configuration data from the FPGA configuration memory for upgrade; and after upgrade is completed, negotiating, by the FPGA, with the host to restore the status of the PCIe link to link up that is used for reloading the PCIe driver upon detection by the host.

In the prior art, a PCIe link is in an unavailable state in an FPGA upgrade process, and in addition, an application program or a PCIe driver on a host may access an FPGA. Because the PCIe link is in the unavailable state, the application program or the PCIe driver on the host reports an error or suspends, leading to an abnormality of an operating system of the host and resulting in downtime or restart. However, when FPGA upgrade is performed by using this method, upgrade is performed only after it is detected that the host has uninstalled the PCIe driver corresponding to the FPGA. In this way, the FPGA upgrade does not interfere with the application program or the PCIe driver on the host, and no abnormality such as downtime occurs. In addition, after the FPGA is upgraded, the host may reload the PCIe driver corresponding to the FPGA, with no need to restart and interrupt other PCIe devices. Furthermore, in this method, the FPGA waits only in an expiration time, avoiding service interruption caused when the FPGA keeps waiting due to an error of the host. In addition, monitoring, through PCIe link status monitoring, whether the host uninstalls the PCIe driver may be implemented by mainstream hardware based on a PCIe slot. Therefore, there is no need to change hardware, and hardware costs are lower.

In one embodiment of the first aspect, before uninstalling the PCIe driver, the host suspends one or more application programs that use a PCIe link to access the FPGA. First, suspending the application program by the host can avoid data loss. In addition, the program is not terminated during suspension, so that the application program can proceed to process services quickly after being resumed later.

In one embodiment of the first aspect, the host resumes operation of the one or more application programs after reloading the PCIe driver. By resuming an application program after loading the PCIe driver, the host can continue service processing without restart, thereby speeding up service processing.

In one embodiment of the first aspect, the first expiration time is a predetermined time required by the FPGA to complete upgrade. For example, the first expiration time may include a time required by the FPGA to complete loading the configuration data required for upgrade from the FPGA configuration memory, a time required by the FPGA to complete initialization and a reset operation after loading, and a margin time. The first expiration time can not only ensure that the FPGA can complete upgrade under normal circumstances, but also prevent the host from being affected by an excessive waiting time.

In one embodiment of the first aspect, the second expiration time is a predetermined time required by the host to complete uninstallation of the PCIe driver after delivering the upgrade instruction. For example, the second expiration time may include a margin time and a time for the host to complete uninstallation of the PCIe driver after sending the upgrade instruction. The second expiration time can not only ensure that the host can complete uninstallation of the driver under normal circumstances, but also prevent the FPGA from being affected by an excessive waiting time.

In one embodiment of the first aspect, the continuously monitoring, by the host in a first expiration time, whether the status of the PCIe link is changed to link up includes: continuously monitoring, in the first expiration time, a link status register located in the host, so as to continuously monitor whether the PCIe link is changed to link up. Monitoring the status of the PCIe link by the host by using the link status register located in the host is simple in implementation, thereby reducing implementation costs.

In one embodiment of the first aspect, the continuously monitoring, by the FPGA in a second expiration time, whether the status of the PCIe link is changed to link down includes: continuously monitoring, by the FPGA in the second expiration time, a link status register located in the FPGA, so as to continuously monitor whether the PCIe link is changed to link down. Monitoring the status of the PCIe link by the FPGA by using the link status register located in the FPGA is simple in implementation, thereby reducing implementation costs.

In one embodiment of the first aspect, if the status of the PCIe link is not changed to link down in a predetermined time, the upgrade process exits. With exiting of the upgrade process, other operations can be re-performed, avoiding being affected by keeping waiting for a status change of the host and failing to process other services.

In one embodiment of the first aspect, the FPGA is located on a PCIe plug-in card, and the PCIe plug-in card is installed in a PCIe expansion slot of the host. This manner is currently a mainstream implementation of connecting a PCIe device to a host, and therefore this method can be applied to the mainstream implementation without changing hardware, lowering implementation costs.

In one embodiment of the first aspect, the FPGA configuration memory is a flash memory chip. The flash memory chip is connected to the FPGA through a serial peripheral interface (SPI). The flash memory is a very common type of memory, simple in use and low in implementation costs.

In one embodiment of the first aspect, loading is started by a user circuit of the FPGA by delivering an underlying command to a loading circuit delivered along with the FPGA. The user circuit is a circuit obtained after a user of the FPGA buys an FPGA chip and loads configuration data. The circuit delivered along with the FPGA is a circuit delivered along with the FPGA by an FPGA manufacturer, and the circuit is built into the FPGA and is not changed by loading or clearing of user configuration data. The underlying command is a command defined by a manufacturer and used by the user to interact with the loading circuit of the FPGA. In this start manner, it can be ensured that the FPGA can load the configuration data from the FPGA configuration memory.

In one embodiment of the first aspect, link down and link up of the PCIe link are both results of PCIe link negotiation between the FPGA and a PCIe interface circuit of the host. The negotiation manner is the prior art, with no need to change a protocol, simplifying implementation.

In one embodiment of the first aspect, the configuration data stored in the FPGA configuration memory is stored by the FPGA before the host sends the upgrade instruction. In one embodiment, the host may save a copy of the configuration data in advance, and then the FPGA receives the configuration data from the host, and saves the configuration data to the FPGA configuration memory through an interface between the FPGA and the FPGA configuration memory. This manner is also referred to as "online" loading and requires no manual operation, more convenient for upgrade.

In one embodiment of the first aspect, in the process of uninstalling the PCIe driver by the host, an AER register is set to block a link abnormality, in other words, the host does not respond to an abnormal event on a link. In this way, the host does not encounter an abnormality such as downtime caused when the link is changed to link down. In a subsequent process of restoring the PCIe driver, the AER register can be configured to enable a link abnormality reporting function, that is, the host can respond to an abnormal event on the link.

According to a second aspect, this application discloses an online FPGA upgrade method performed by an FPGA. The FPGA communicates with a host through a PCIe link, the FPGA is further connected to an FPGA configuration memory, and the FPGA configuration memory stores configuration data required for upgrading the FPGA. The method includes: receiving an upgrade instruction delivered by the host; continuously monitoring in an expiration time whether a status of the PCIe link is changed to link down, where link down is a status of the PCIe link after the host uninstalls a PCIe driver corresponding to the FPGA; if it is detected in the expiration time that the PCIe link is changed to link down, loading the configuration data from the FPGA configuration memory for upgrade; and after upgrade is completed, negotiating with the FPGA to restore the status of the PCIe link to link up, where link up is used for reloading the PCIe driver upon detection by the host.

The second aspect of this application is based on a same inventive concept as the first aspect, except that an execution body is changed to the FPGA. Therefore, for embodiments of the second aspect, reference may also be made to the embodiments performed by the FPGA in the first aspect. The second aspect and the embodiments of the second aspect may also achieve effects similar to those of the first aspect and the embodiments of the first aspect.

According to a third aspect, this application discloses an FPGA upgrade method performed by a host. The host is connected to an FPGA through a PCIe link, the FPGA is connected to an FPGA configuration memory, and the FPGA configuration memory stores configuration data required for upgrading the FPGA. The method includes: delivering, by the host, an upgrade instruction to the FPGA; uninstalling a PCIe driver corresponding to the FPGA, so that a status of the PCIe link is changed to link down; continuously monitoring in a first expiration time whether the status of the PCIe link is changed to link up; and reloading the PCIe driver if it is detected that the status of the PCIe link is changed to link up. The upgrade instruction is an instruction that enables the FPGA to perform the following operations upon reception: continuously monitoring in a second expiration time whether the status of the PCIe link is changed to link down, where link down is a status of the PCIe link after the host uninstalls the PCIe driver corresponding to the FPGA; if it is detected in the second expiration time that the PCIe link is changed to link down, loading the configuration data from the FPGA configuration memory for upgrade; and after upgrade is completed, negotiating with the host to restore the status of the PCIe link to link up that is used for reloading the PCIe driver upon detection by the host.

The third aspect of this application is based on a same inventive concept as the first aspect, except that an execution body is changed to the host. Therefore, for embodiments of the third aspect, reference may also be made to the embodiments performed by the host in the first aspect. The third aspect and the embodiments of the third aspect may also achieve effects similar to those of the first aspect and the embodiments of the first aspect.

According to a fourth aspect, this application discloses an FPGA board, including an FPGA chip and an FPGA configuration memory (a non-volatile memory such as a flash memory). The FPGA loads configuration data stored in the FPGA configuration memory to perform the operations performed by the FPGA in the second aspect and the embodiments of the second aspect, and the same effects can be achieved as the second aspect. It can be understood that the FPGA may have a circuit (for example, a configuration loading circuit) provided by a manufacturer. In this case, in this application, a circuit defined by the configuration data may work with the circuit provided by the manufacturer to complete the operations performed by the FPGA in the second aspect and the embodiments of the second aspect.

In the foregoing several aspects and the embodiments, the FPGA and the host may be connected only through the PCIe link. In another embodiment, the FPGA and the host are alternatively connected through a reserved pin to transmit information used to indicate a working status. In one embodiment, the FPGA loads the configuration data stored in the FPGA configuration memory to perform the operations performed by the FPGA in Embodiments 2 and 3.

According to a fifth aspect, this application discloses a host device. The host device includes a processor (for example, a CPU) capable of executing a software instruction and a memory. The memory may include a non-volatile memory (for example, a magnetic disk or a flash memory) and a volatile memory (for example, an internal memory). With cooperation of the processor and the memory, the processor may execute the instruction stored in the memory, and complete the operations performed by the host in the second aspect and the embodiments of the second aspect, thereby achieving effects corresponding to the second aspect and the embodiments of the second aspect. In another manner in which the FPGA and the host are alternatively connected through a reserved pin, the host may alternatively execute the instruction stored in the memory to perform the operations performed by the host in Embodiments 2 and 3.

According to a sixth aspect, this application discloses an electronic device. The electronic device includes the FPGA board according to the fourth aspect and the host device according to the fifth aspect.

According to a seventh aspect, this application discloses a computer storage medium. The computer storage medium stores a plurality of instructions to be executed by a processor. These instructions are instructions that are to be read by the processor and enable the processor to perform the operations performed by the host in the third aspect and the embodiments of the third aspect.

The third aspect to the seventh aspect and the embodiments of the aspects are based on a same inventive concept as the first aspect and the embodiments of the first aspect, and therefore the same effects can be achieved as the first aspect and the embodiments of the first aspect.

BRIEF DESCRIPTION OF DRAWINGS

To describe the technical solutions in the embodiments of the present application or the prior art more clearly, the following briefly describes the accompanying drawings for describing the embodiments or the prior art. The accompanying drawings in the following description show merely some embodiments of the present application, and a person of ordinary skill in the art may derive other drawings from these accompanying drawings without creative efforts.

DESCRIPTION OF EMBODIMENTS

The following describes the embodiments of the present application with reference to accompanying drawings.

Figure 1:
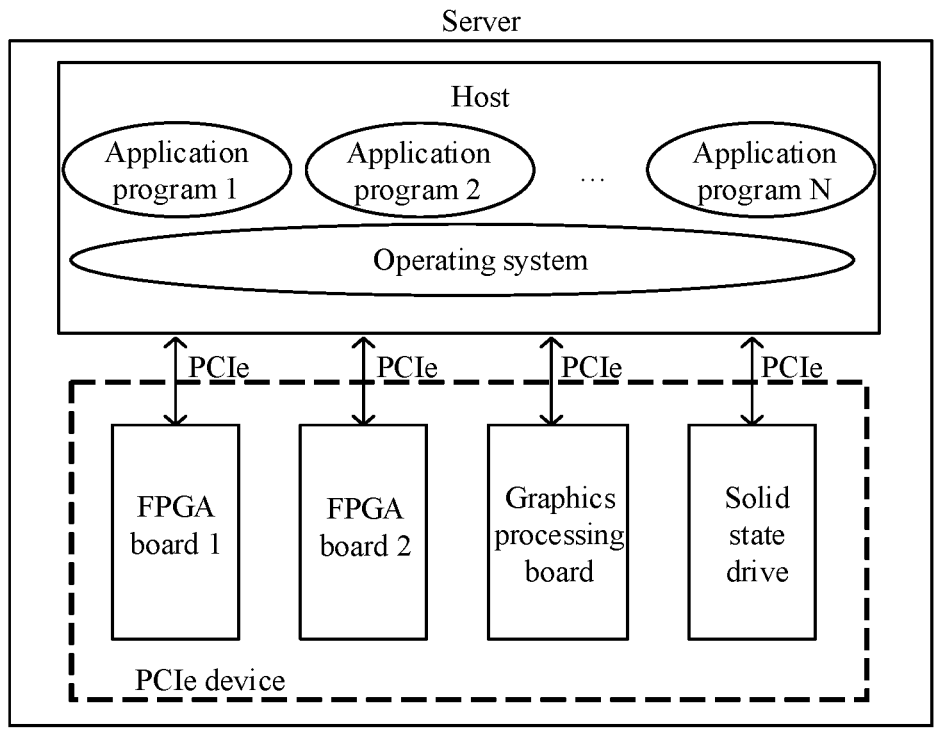
FIG. 1 is a schematic diagram of connecting a host of a server to a PCIe device through a PCIe link.
Figure 2:
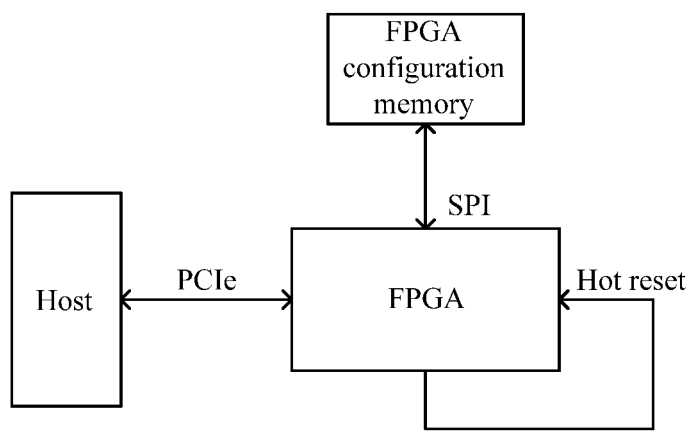
FIG. 2 is a schematic diagram of connecting an FPGA to a host.
Figure 3:
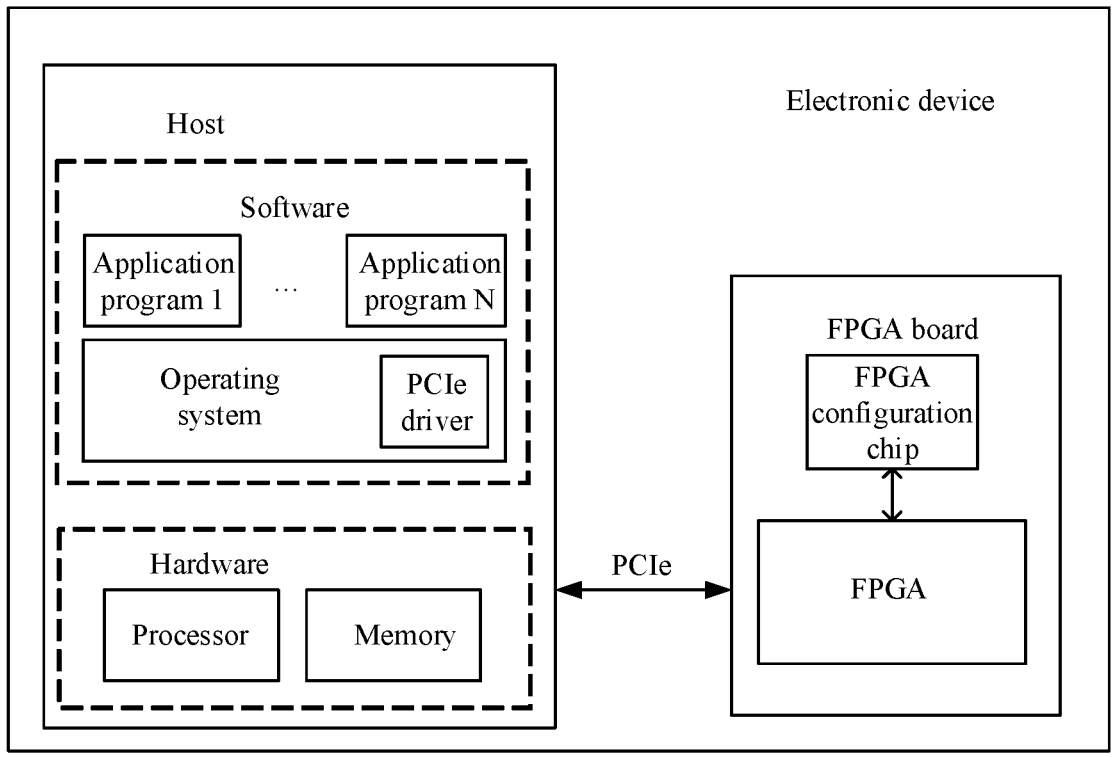
FIG. 3 is a schematic structural diagram of a host and an FPGA board of a computing device.

An FPGA upgrade method disclosed in this application may be applied to an FPGA-based device. FIG. 3 is a schematic diagram of an electronic device to which the method is applied. The electronic device herein may be a computing device with a computing capability, for example, a personal computer, a server, or a workstation. Certainly, this application may alternatively be applied to other electronic devices, such as various network devices (for example, gateways, routers, and switches).

FIG. 3 is used as an example, and the computing device may include a host and an FPGA board. From a perspective of hardware, the host may generally include a general-purpose processor (for example, a CPU based on an x86 instruction set or an ARM instruction set) with a software processing capability, and further include a non-volatile memory (for example, a hard disk or a flash memory) configured to store a software instruction and various data, and a memory (for example, an internal memory) that stores a software instruction and temporary data that are required for a processor operation. The processor can read the software instruction stored in the non-volatile memory to complete a corresponding function. At a software level, the host usually includes an operating system (for example, a Windows operating system or a Linux operating system) and various application programs running on the operating system. In addition, the host may further include various dedicated processing circuits (for example, various ASICs), for example, bridge chips and graphics processing units. One or more of the processing circuits of the host may be packaged into one or more chips. For example, the bridge chips and the CPU may be packaged into one chip, and the graphics processing units may be packaged into one chip separately. This is not limited in this application.

Figure 4:
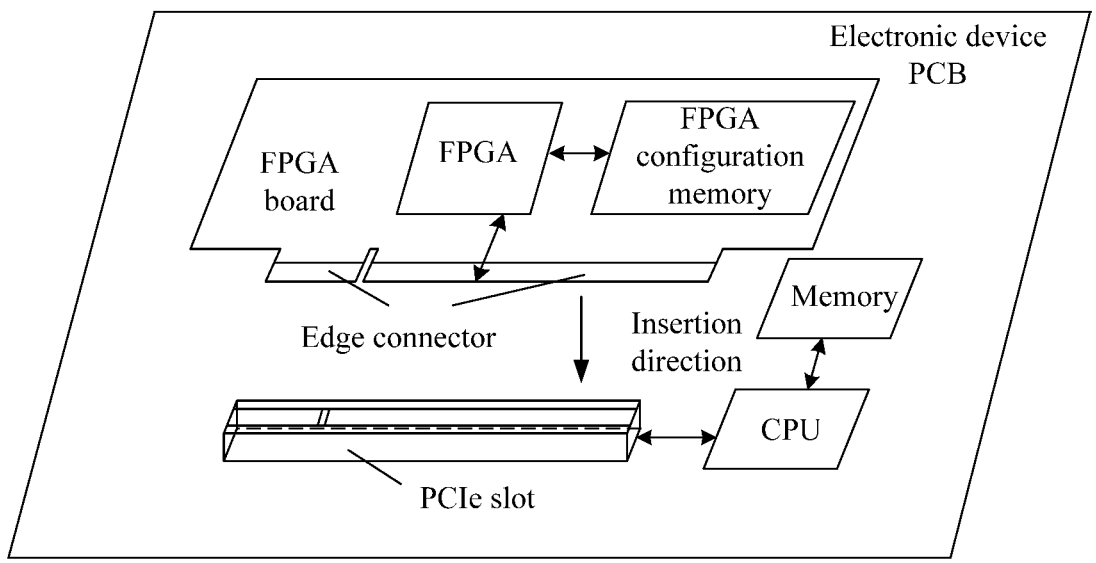
FIG. 4 is a schematic structural diagram of connecting an FPGA board to a processor and a memory of a host by using a PCIe slot.

The computing device further includes the FPGA board. The FPGA board herein is a board in a PCB form that can be physically connected to and communicate with the host by using a PCIe slot provided on the electronic device. The FPGA board includes an FPGA chip (referred to as an "FPGA" in this application) and an FPGA configuration memory configured to store FPGA upgrade data. The FPGA configuration memory may be a non-volatile memory such as a flash memory, and may further include another component such as a cache chip (for example, an SDRAM). When the FPGA configuration memory is a flash memory, the FPGA and the FPGA configuration memory may communicate with each other through an SPI interface. Referring to FIG. 4, in this application, the electronic device may further include the PCIe slot (located in the PCB of the electronic device). A physical pin, on the PCIe slot, configured to implement a PCIe link is connected to the processor (for example, the CPU) of the host. In addition, the FPGA board may further include an edge connector, adapted to the PCIe slot, configured to implement the PCIe protocol. The edge connector is connected to the FPGA through routing on the PCB. Therefore, a physical connection and communication between the FPGA and the host can be implemented by inserting the edge connector into the PCIe slot.

Those skilled in the art can understand that a basic working principle of the FPGA is to change content of a configuration RAM of the FPGA by loading configuration data (for example, in a form of a configuration file), so as to change configuration of various logic resources inside the FPGA to implement different circuit functions. In addition, configuration data may be loaded for a plurality of times, so that the FPGA can complete different functions by loading different configuration data, achieving great flexibility. In the actual application, a function of the FPGA usually needs to be updated. In this case, new configuration data may be loaded into the FPGA configuration memory in advance, and then the FPGA loads the new configuration data to implement a function defined by the new configuration data. This process is an FPGA upgrade process. In addition, upon factory delivery, the FPGA has a configuration load circuit configured to load configuration data. This configuration load circuit may be configured to ensure a most basic loading operation when a user-defined circuit function (that is, a function defined by the configuration data) fails.

In practice, to increase system stability, the FPGA configuration memory may store two pieces of configuration data, one is a basic version used to provide the FPGA with basic functions and generally cannot be modified by a user, and the other is a normal service version, and in one embodiment, a current latest service version used to provide the FPGA with a function required by a normal service. When being started, the FPGA first checks an offset address of a header (data header) part of the basic version, and if the offset address directs to the service version, loads the service version starting from the offset address. If the FPGA needs to be updated later, the host may communicate with the FPGA first, and replace the original service version with new configuration data for upgrade. In this way, after upgrade is successful, when the FPGA is restarted, the new configuration data is loaded from the offset address; if the upgrade fails (that is, loading the service version from the offset address fails), the FPGA may load the basic version for operation of the FPGA.

After the FPGA board is connected to the host, the host may access the FPGA on the FPGA board by running software. In this application, the application programs on the host may communicate with the FPGA by using the PCIe protocol through a PCIe driver delivered along with the operating system or a PCIe driver that the user installs independently after installing the operating system. In addition, an upgrade-related control operation (for example, starting upgrade, suspending/resuming an application program operation, and uninstalling a PCIe driver) in this application can be provided by a third-party application program. For example, an FPGA board manufacturer may provide an application program adapted to the FPGA board. When a server user needs to use the FPGA board, the application program provided by the FPGA board manufacturer can be installed on the host to implement a control operation on the FPGA.

Embodiment 1

Figure 5:
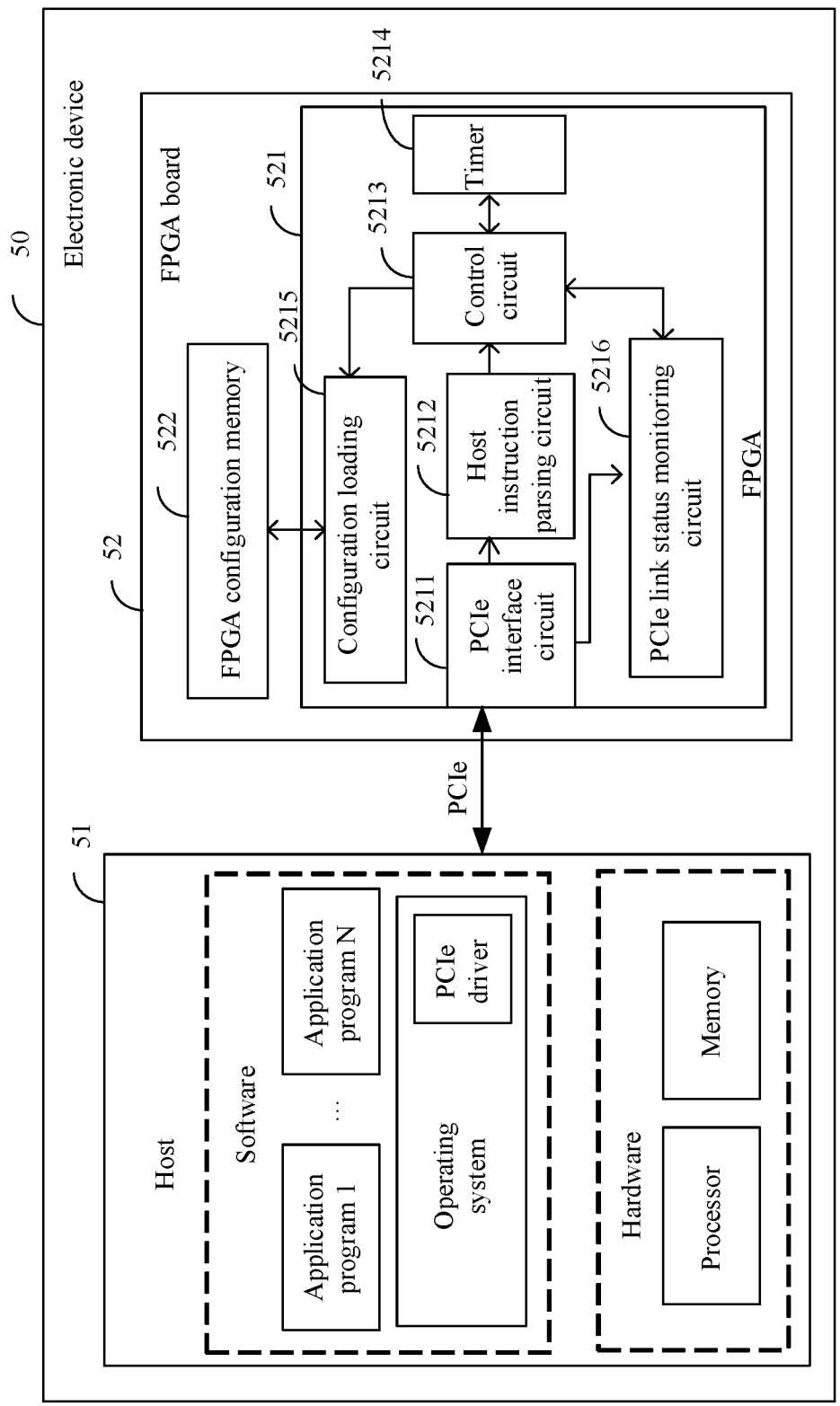
FIG. 5 is a schematic structural diagram of a host and an FPGA board of an electronic device according to Embodiment 1 of this application.

This embodiment describes an FPGA upgrade method based on an application scenario in which an FPGA board is connected to a host by using a PCIe slot. FIG. 5 is a structural block diagram of the application scenario in this embodiment. Based on FIG. 5, the following separately details execution processes on a host side and an FPGA board side.

Figure 6:
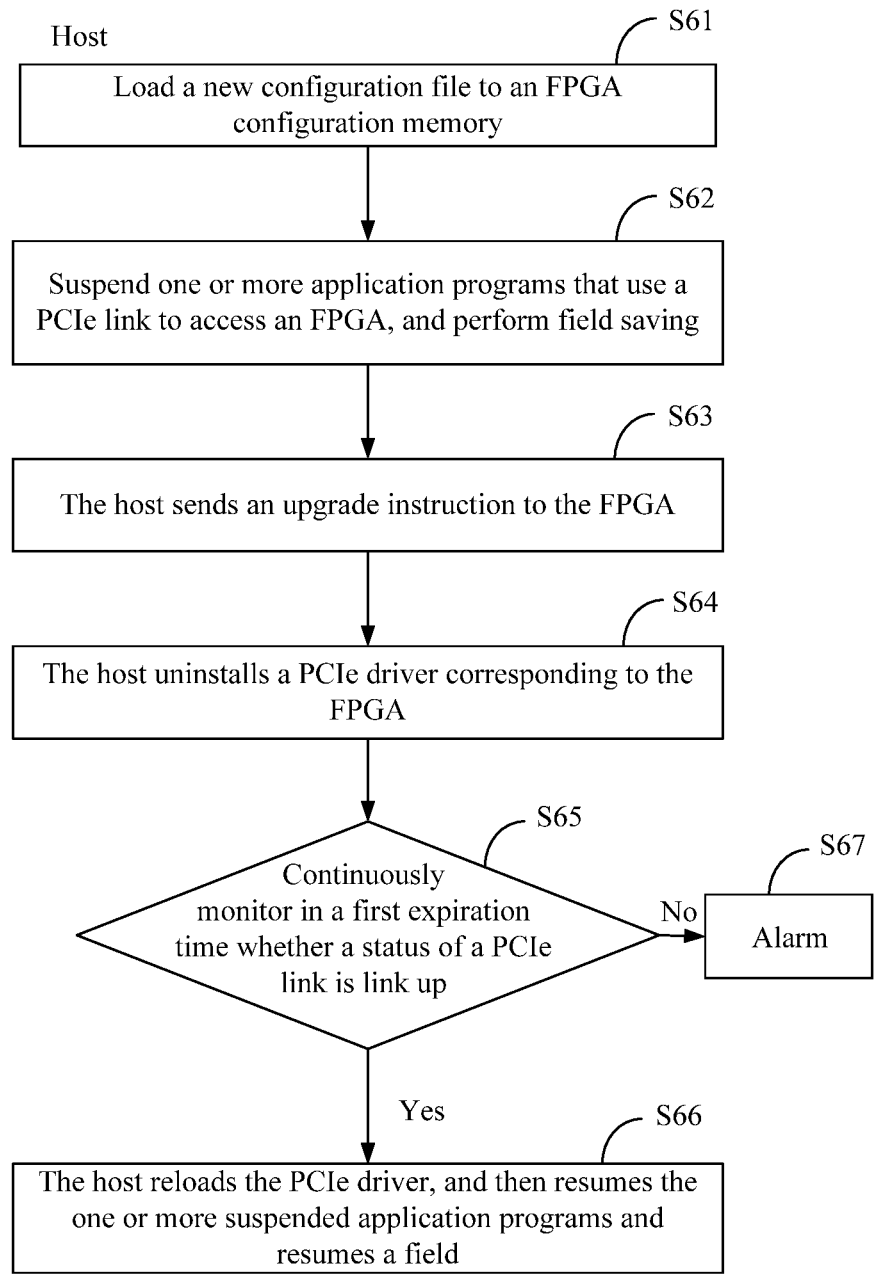
FIG. 6 is a flowchart of a method performed by a host according to Embodiment 1 of this application.

FIG. 6 is a flowchart on the host side. Each method operation in a process may be performed in a software manner by reading an instruction in a memory by a processor (for example, a CPU) of the host. Software may be an upgrade program, provided by an FPGA board manufacturer, used for FPGA board upgrade. The upgrade program may be a third-party application program (that is, not delivered along with an operating system, but an additionally installed application program after the operating system is installed), or certainly, may be a program delivered along with the operating system. In one embodiment, the host performs the following method.

S61. Load new configuration data into an FPGA configuration memory.

The host may interact with a user and complete loading the new configuration data by using upgrade software (for example, GUI or command line-based software). The upgrade software may be separate software, and the software may be provided to other software invoking interfaces, so that other software may invoke the software to complete FPGA upgrade. In addition, the upgrade software may alternatively be one or more software modules in other software. This is not limited in this application.

For example, the user selects, by using the upgrade software, new configuration data located locally on the host or located remotely and a to-be-upgraded target FPGA, then clicks a "load" button provided on the software to load the selected new configuration data into the FPGA configuration memory, and completes other operations by clicking other buttons (for example, clicking a specified "upgrade" button to perform a subsequent operation). Alternatively, a "load" operation may be combined with an "upgrade" operation, for example, only the "upgrade" button is clicked. In this case, a dialog box pops up for the user to select the to-be-loaded new configuration data, and a subsequent operation is automatically performed after selection. Certainly, the foregoing is just several simple examples. In practice, the new configuration data may be loaded into the FPGA configuration memory by using other methods.

S62. Suspend one or more application programs that use a PCIe link to access the FPGA, and perform field saving.

In this application, suspension means a temporary stop. In one embodiment, software is not shut down, and may be resumed from a suspension position, with no need to be started from the beginning after being resumed. The suspension operation may be completed by invoking some APIs delivered along with the operating system. An implementation is in the prior art, and is not described in detail in this application. An advantage of suspension is that there is no need to close an application program, thereby minimizing interference with a service.

A meaning of field saving is well known in the fields of communication technologies and software technologies. Field saving mainly means when some services need to be suspended, some data used in the services are saved, so that when being resumed, the services can be continued based on the previous data. In this application, field saving may include saving data on the host, and may further include saving data generated in an FPGA operation process. For example, for a scenario in which an FPGA assists the host in completing compression, in this case, the host may save intermediate data (for example, compressed data from the FPGA) obtained in an execution process of a host application program (a compression program), or data (for example, data loaded into an internal memory by a compression program) of an application program, or various data (for example, information used to indicate a location of data that the FPGA currently compresses/or has completed) used in an FPGA operation process.

If an FPGA is used in field saving, the host usually needs to interact with the FPGA. In one embodiment, the host notifies, based on content that needs to be saved, the FPGA to perform reporting. A implementation of field saving may be performed by those skilled in the art based on different saving requirements. This is not described in detail in this application. It should be noted that this operation is not a mandatory operation. If there is no running application program, this operation may be skipped, or if the user does not require fielding saving (for example, it can be determined in advance that there is no data loss even if field saving is not performed, or data loss is acceptable), field saving may not be performed.

S63. The host sends an upgrade instruction to the FPGA.

The host may send an upgrade instruction to the FPGA through a PCIe interface by using an installed upgrade program, and the upgrade instruction is used to instruct the FPGA to upgrade. It should be noted that to upgrade the FPGA, upgrade data used for FPGA upgrade needs to be stored in the FPGA configuration memory in advance, and the upgrade data may be the new configuration data of the FPGA. In one embodiment, the host may transmit the new configuration data to the FPGA through the PCIe interface, and then the FPGA transmits the new configuration data to the FPGA configuration memory through an interface (for example, an SPI interface or other customized interfaces). In such a transmission manner, remotely online loading may be implemented. In one embodiment, the host can be controlled through a network to load the new configuration data into the FPGA configuration memory, implementing loading of the new configuration data without manual operation on site.

S64. The host uninstalls a PCIe driver corresponding to the FPGA.

In one embodiment, the PCIe driver may be uninstalled by invoking an operating system API by using the upgrade software. When the PCIe driver is uninstalled, the PCIe interface on the host side is reset. Therefore, after the PCIe driver is uninstalled, a link status of the PCIe interface is changed from link up to link down. This change may be detected by the FPGA, so that an upgrade operation (loading the new configuration data from the FPGA configuration memory) of the FPGA is triggered. In addition, it should be noted that, to reload the PCIe driver corresponding to the FPGA later, the host should locally (in a non-volatile storage medium such as a hard disk) keep a file for the PCIe driver of the FPGA. In one embodiment, the host may keep the file before upgrade starts, or download the file from the Internet online before reloading.

Those skilled in the art may uninstall the PCIe driver based on different application scenarios with reference to the prior art. For example, in a Linux operating system, uninstalling the PCIe driver may include the following operations: (1) uninstall a drive file by using a command such as rmmod xxx.ko; (2) block a link abnormality by using an AER register, in other words, preventing the host from responding to an abnormal event on a link; (3) disable (disable) a link control register (link control register); and (4) remove (remove) a device. After the foregoing operations, a status of a PCIe link may be changed to link down in the Linux operating system, and this may be detected by the FPGA. The link control register may be enabled (enable) later (for example, the link control register may be enabled after a preset time, and the preset time may be less than a loading time of the FPGA). The foregoing operation in the Linux operating system is merely an example, and those skilled in the art may implement a similar function in other application scenarios by using the foregoing method.

S65. Continuously monitor in a first expiration time whether the status of the PCIe link is link up (link up); and if yes, perform S66, or if no, perform S67.

In this application, "continuously monitoring" means that a continuous monitoring action is performed in a monitoring process, so as to complete effective monitoring within a predetermined time (for example, the first expiration time in this operation). In other words, if the status of the PCIe link is changed to link up, this status can be detected in the predetermined time. By contrast, if monitoring is performed once at any selected time point, a change in the status of the PCIe link may not be effectively detected (for example, if a relatively close monitoring time point is set, the status is not changed to link up during monitoring, but is changed to link up after monitoring. In this case, monitoring is performed only once, and therefore effective monitoring cannot be implemented). In one embodiment, continuous monitoring may be performed periodically or may be performed for a plurality of times in a customized aperiodic manner. A smaller monitoring period indicates quicker detection on whether the status of the PCIe link is changed to link up. Certainly, in an extreme case, monitoring may be set to be performed only once (that is, it may be considered that the period for continuous monitoring is equal to the predetermined time), that is, monitoring is performed once when the predetermined time is about to elapse.

A manner of monitoring the link status is the prior art. For example, whether the status is link up may be determined by querying a PCIe-related register (for example, a PCIe link status register stipulated by the PCIe protocol) on the host. In this embodiment, after S64 is performed, the status of the PCIe link is changed to link down (link down). After the FPGA performs upgrade and negotiates with the host again, the status of the PCIe link is changed to link up again. Therefore, monitoring whether the status is changed to link up in this embodiment is used to determine whether the FPGA completes upgrade and starts normal operation.

In this embodiment, performing determining only in the first expiration time is to prevent the host from keeping waiting due to an FPGA error. In other words, in this embodiment, the host waits for a maximum of the first expiration time. If the first expiration time elapses but the FPGA has not completed upgrade, it indicates that there may be a problem on the FPGA side, and the host does not need to wait any longer. In this case, the host may alert the user to a possible problem with FPGA upgrade in a manner such as an alarm, and the host does not need to perform operation S65 any longer to save host resources.

The "first expiration time" may be considered as "a predetermined time required by a peer FPGA to complete upgrade". In this application, completion of upgrade (or "upgrade completion") means that the FPGA completes operations required for upgrade, for example, loading configuration data (which may include loading a basic version after loading the new configuration data fails) and hot reset. Those skilled in the art may set the first expiration time with reference to the operation time required by the FPGA to complete upgrade.

For example, the time includes at least the following primary time "time for the FPGA to load the new configuration data from the FPGA configuration memory+margin time". The loading operation is mandatory, and loading time cannot be estimated very accurately. Therefore, a particular margin is reserved. In practice, the time also includes other types of time, for example, a time for changing the status of the PCIe link from link down to link up, a time for detecting a status change by the FPGA, and a time for reset after the FPGA completes loading. The foregoing types of time are very small in weight and may be ignored, or a larger margin time may be set to replace the foregoing types of time.

In addition, an existing FPGA usually loads configuration data of a basic version after the existing FPGA fails to load new configuration data. If the FPGA performs such an operation, the first expiration time may further include a time required for loading the basic version.

Those skilled in the art may determine the time in such manners as theoretical analysis and experimental testing. For example, under normal circumstances, "the time for loading the new configuration data by the FPGA from the FPGA configuration memory" is a primary time. The time may be estimated according to the formula of "Size of new configuration data/FPGA configuration rate", where the size of new configuration data is known, and the FPGA configuration rate is equal to a clock frequency of an FPGA configuration interface (for example, a clock frequency of the SPI interface). A particular magnitude of the margin time may be determined by those skilled in the art with reference to actual application requirements. For example, for the sake of safety, a large margin time may usually be set.

A implementation of this operation may be performed by using different methods, two of which are described below.

Method 1

Figure 7A:
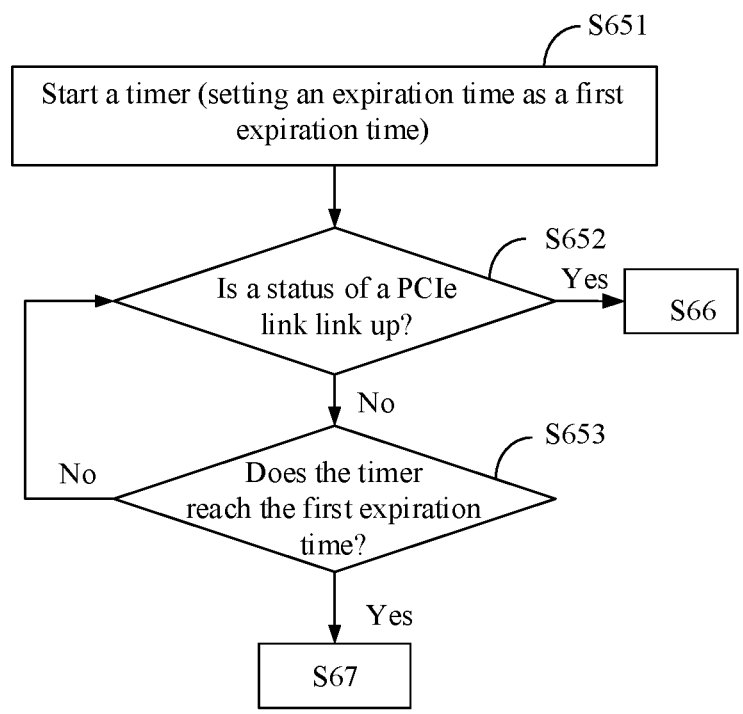
FIG. 7A is a flowchart of monitoring in an expiration time whether a status of a PCIe link is link up in operation S65 of the method in FIG. 6.

A timer is started to continuously monitor in the first expiration time whether the status of the PCIe link is link up. For details, refer to FIG. 7A. The following operations are included.

S651. Start a timer, where an expiration time of the timer is set as the "first expiration time".

S652. Monitor whether the status of the PCIe link is link up; and if yes, perform S66; or if no, perform S653.

S653: Determine whether the timer reaches the specified first expiration time; and if no, perform S652, or if yes, perform S67.

Method 2

Figure 7B:
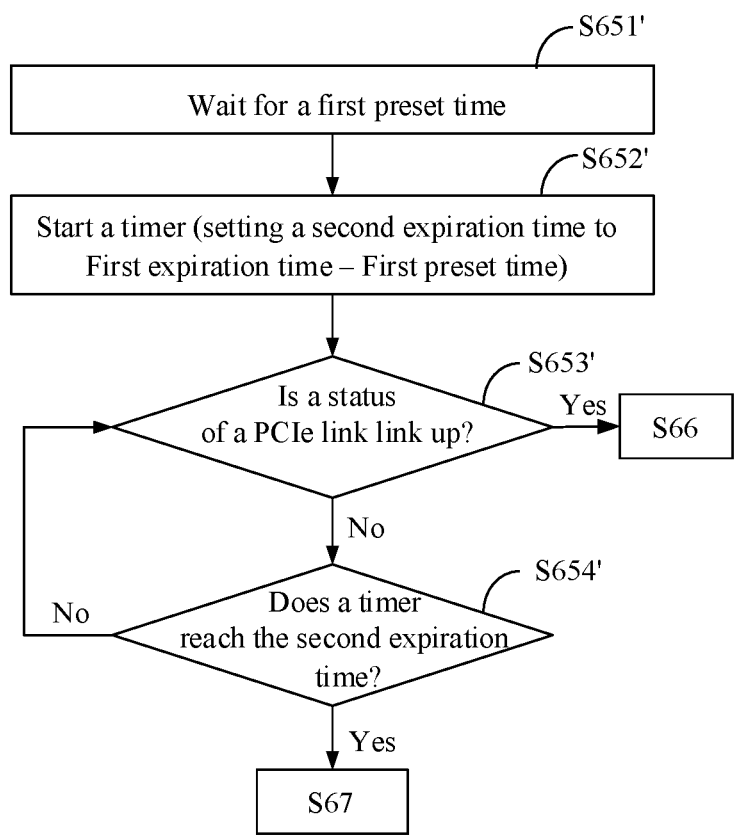
FIG. 7B is another flowchart of monitoring in an expiration time whether a status of a PCIe link is link up in operation S65 of the method in FIG. 6.

After a period of time elapses, a timer may be started to monitor whether the status of the PCIe link is link up. In one embodiment, the FPGA requires a particular time for loading, and therefore whether the status of the PCIe link is link up does not need to be immediately monitored (the status is definitely not link up at the beginning), and may be monitored later. For details, refer to FIG. 7B. The following operations are included.

S651'. Wait for a first preset time, where the first expiration time is a time to complete upgrade by the FPGA under normal conditions, and the user may derive the time through analyses and experiments, and may reserve a particular margin to ensure reliability.

S652'. Start a timer, where a second expiration time of the timer may be set to "the first expiration time—the first preset time". In this case, compared with Method 1, waiting is performed for the first preset time, and therefore, an expiration time of the timer does not need to be as long as the first expiration time, and may be obtained by subtracting the first preset time.

S653'. Monitor whether the status of the PCIe link is link up; and if yes, perform S66, or if no, perform S654'.

S654'. Determine whether the timer reaches the expiration time that is set; and if no, perform S653', or if yes, perform S67.

S66. The host reloads the PCIe driver, and then resumes the one or more suspended application programs and resumes a field.

When determining that the status of the PCIe link is changed from link down to link up, the upgrade program may find an upgraded FPGA by performing PCIe link scanning and a device enumeration operation, so as to reload the PCIe driver. Finally, the application programs previously suspended are resumed for operation and are allowed to access the upgraded FPGA, and the field is resumed.

How to reload the PCIe driver may be implemented by those skilled in the art based on different application scenarios with reference to the prior art. For example, in the Linux operating system, reloading the PCIe driver may include the following operations: (1) load a drive file by using a command such as insmod xxx.ko; and (2) configure an AER register and enable a link abnormality report function, in other words, allowing the host to respond to an abnormal event on a link. The foregoing operation in the Linux operating system is merely an example, and those skilled in the art may implement a similar function in other application scenarios by using the foregoing method.

It should be noted that for an existing FPGA, a basic version is usually automatically loaded after loading fails. Although normal communication with the host can be performed, a normal service requirement cannot be met. In other words, although "upgrade completed" is implemented for the PFGA (configuration data that is a basic version or new configuration data is loaded), but it does not mean that "upgrade is successful" (the new configuration data is loaded). Therefore, after the PCIe driver is reloaded and before operation of the one or more application programs is resumed and the field is resumed, the host may further determine whether upgrade is successful (that is, whether the new configuration data is loaded) by proactively querying a logic version number (corresponding to a version of the configuration data) of the FPGA. If it is determined that upgrade is successful (that is, the logic version number is a version number corresponding to the new configuration data), a service is normally performed later. If it is determined that upgrade fails, various failure processing may be performed, for example, various operations such as re-upgrading, reloading new configuration data for upgrade, or issuing an alarm may be performed.

S67. The host issues an alarm.

If the status of the PCIe link is not changed to link up in the first expiration time, it indicates a high probability of an FPGA loading problem (for example, the configuration data of the FPGA is incorrect). In this case, the host may issue the alarm to inform the user of abnormality information for subsequent processing.

Figure 8:
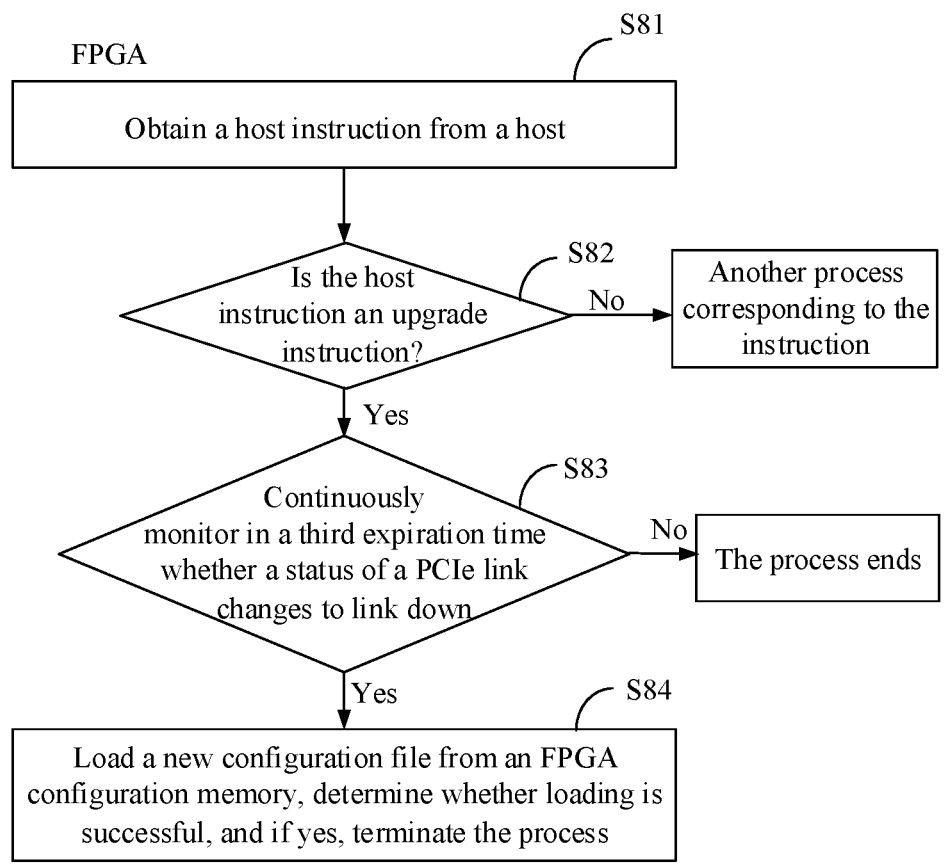
FIG. 8 is a flowchart of a method performed by an FPGA according to Embodiment 1 of this application.

FIG. 8 is a flowchart of a method performed by an FPGA, and the following operations are included.

S81. Obtain a host instruction from a host.

S82. Determine whether the obtained host instruction is an upgrade instruction; and if yes, perform S83, or if no, perform an operation corresponding to the instruction.

In one embodiment, the instruction transmitted on a PCIe link may be received by using a PCIe interface circuit 5211 of an FPGA 521. After being received, the instruction may be placed in a register, and then a host instruction parsing circuit 5212 may be used to analyze whether the instruction in the register is an upgrade instruction. If the instruction in the register is an upgrade instruction, a message may be sent to a control circuit 5213 to notify the control circuit to control an upgrade process.

S83. Continuously monitor in third expiration time whether a status of the PCIe link is changed to link down (link down); if yes, perform S84, or if no, terminate the process; then wait to receive another instruction, and if the instruction is received, proceed to S81.

Link status monitoring may be completed by a PCIe link status monitoring circuit 5216. After monitoring is completed, a result may be sent to the control circuit 5213, and the control circuit 5213 performs subsequent processing. For a monitoring method, refer to the detailed description of operation S65. In this operation, whether the host completes uninstallation of a driver is determined by monitoring whether the status of the PCIe link is changed from link up to link down. The FPGA starts an upgrade operation only after uninstallation of the driver is completed; otherwise, an abnormality (for example, downtime or restart) of the host may be caused.

Continuous monitoring in an expiration time (the third expiration time) is to prevent the abnormality of the host from affecting operation of the FPGA. In other words, the FPGA waits only for the third expiration time. If upgrade is not completed within the expiration time, it indicates that the host is abnormal, and the FPGA performs another operation instead of waiting.

The third expiration time may be considered as "a predetermined time required by the host for completing uninstallation of a PCIe driver after the upgrade instruction is delivered". For example, based on the foregoing process performed on the host side, the time may include "a time required by the host for uninstalling the driver+a margin time".

For details on how to continuously monitor in the third expiration time whether the status of the PCIe link is changed to link down, refer to the methods in S651 to S653 and S651' to S654'. That is, a timer 5214 may be started to continuously monitor in the third expiration time whether the status of the PCIe link is changed to link down; or after a period of time (the time required by the host for uninstalling the driver) elapses, the timer 5214 may be started to monitor whether the status of the PCIe link is changed to link down.

It should be noted that in this application, sequences of the two operations S62 and S63 performed on the host side are exchangeable. In this case, the third expiration time may be adaptively adjusted. In one embodiment, a time for application suspending and field saving may be added to the third expiration time. That is, in this case, the third expiration time may include "the time required for application suspending and field saving+the time required by the host for uninstalling the driver+the margin time".

S84. Load new configuration data from an FPGA configuration memory; determine whether loading is successful; and if loading is successful, terminate the process.

In one embodiment, the control circuit 5213 notifies a configuration loading circuit 5215 to load the new configuration data from the FPGA configuration memory 522, so as to complete FPGA upgrade. The configuration loading circuit 5215 is a circuit delivered along with the FPGA. This circuit is always present and will not be lost due to data loss (for example, power failure or manual removal) of a configuration RAM. A user-defined circuit (defined by configuration data) in a process of using the FPGA by the user may send a related signal to the configuration loading circuit before being disabled (that is, before loading of the FPGA, there is an operation of clearing an internal logic circuit, for example, clearing the internal configuration RAM used for circuit configuration), to indicate the configuration loading circuit to load the new configuration data from the FPGA configuration memory. In this way, the configuration loading circuit can complete loading the new configuration data later.

For example, the control circuit (the user-defined circuit) may interact with the configuration loading circuit. A packet form may be a packet format specified by an FPGA manufacturer. Packets are roughly classified into four categories by function: device synchronization packets, configuration loading address packets, configuration loading command packets, and device desynchronization packets.

Composition of hexadecimal data of a packet sequence is related to a configuration loading circuit provided by a particular FPGA manufacturer. The manufacturer Xilinx is used as an example. Composition of a packet sequence between the control circuit and the configuration loading circuit of the FPGA is as follows:

(1) Device synchronization packet: using hexadecimal data of 0xFFFFFFFF/0x000000BB/0x11220044/0xFFFFFFFF/0xAA995566/0x20000000. This packet is used to first check a bit width of an SPI bus, and then perform device synchronization on the configuration loading circuit and the control circuit of the FPGA.

(2) Configuration loading address packet: using hexadecimal data of 0x30020001/loading start address/0x20000000/0x20000000. This packet is used by the control circuit of the FPGA to inform the configuration loading circuit of a loading start address, of to-be-loaded FPGA configuration data, in the FPGA configuration memory.

(3) Configuration loading command packet: using hexadecimal data of 0x30008001/0x0000000F/0x20000000/0x20000000. This packet is used by the control circuit of the FPGA to control the configuration loading circuit to start loading the configuration data of the FPGA from the FPGA configuration memory.

(4) Device desynchronization packet: using hexadecimal data of 0x30008001/0x0000000D/0x20000000/0x20000000. This packet is used to desynchronize the configuration loading circuit and the control circuit of the FPGA.

The configuration loading circuit validates data in a loading process. If validation is successful, it indicates that loading is successful; otherwise, loading fails. To prevent an operation failure of the FPGA caused by a loading failure, in an implementation, a plurality of versions of configuration data may be stored in the FPGA configuration memory. At least one of the plurality of versions is a validated basic version. After loading the new configuration data used for upgrade this time fails, the FPGA may automatically load the basic version by using the configuration loading circuit, thereby ensuring normal operation of the FPGA. In addition, the host uninstalls the PCIe driver before upgrade, and after uninstallation of the PCIe driver, with reference to the change in the status of the PCIe link, the FPGA learns when to start upgrade. Furthermore, after the configuration data is successfully loaded, the FPGA usually performs hot reset to complete tasks, for example, initializing an internal register of the FPGA.

It should be noted that "terminate the process" in this operation means terminating an upgrade-related process. Next, the FPGA operates based on an existing operation manner. For example, the FPGA negotiates with the host to establish a PCIe link, so that the status of the PCIe link is changed to link up, and then performs various service communication with the host.

In this embodiment, before upgrade, the FPGA waits in the predetermined time for the host to uninstall the PCIe driver, and is upgraded only after uninstallation is completed. In this way, there is no PCIe driver corresponding to the FPGA, and the host is not affected by upgrade of the FPGA, avoiding an abnormality such as a crash of the host in the upgrade process of the FPGA. In addition, in this embodiment, both the FPGA and the host determine a status of each other only in the predetermined time, thereby avoiding impact of keeping waiting due to an abnormality such as a crash of a peer device. In addition, in this embodiment, a PCIe link status change is monitored to determine a progress of the peer end, so that a pin for out-of-band communication (that is, a pin using a channel other than a PCIe link for communication) does not need to be reserved. This is quite applicable to an application scenario based on a PCIe expansion card, with no need to change hardware, thereby reducing costs and simplifying implementation.

Embodiment 2

Figure 9:
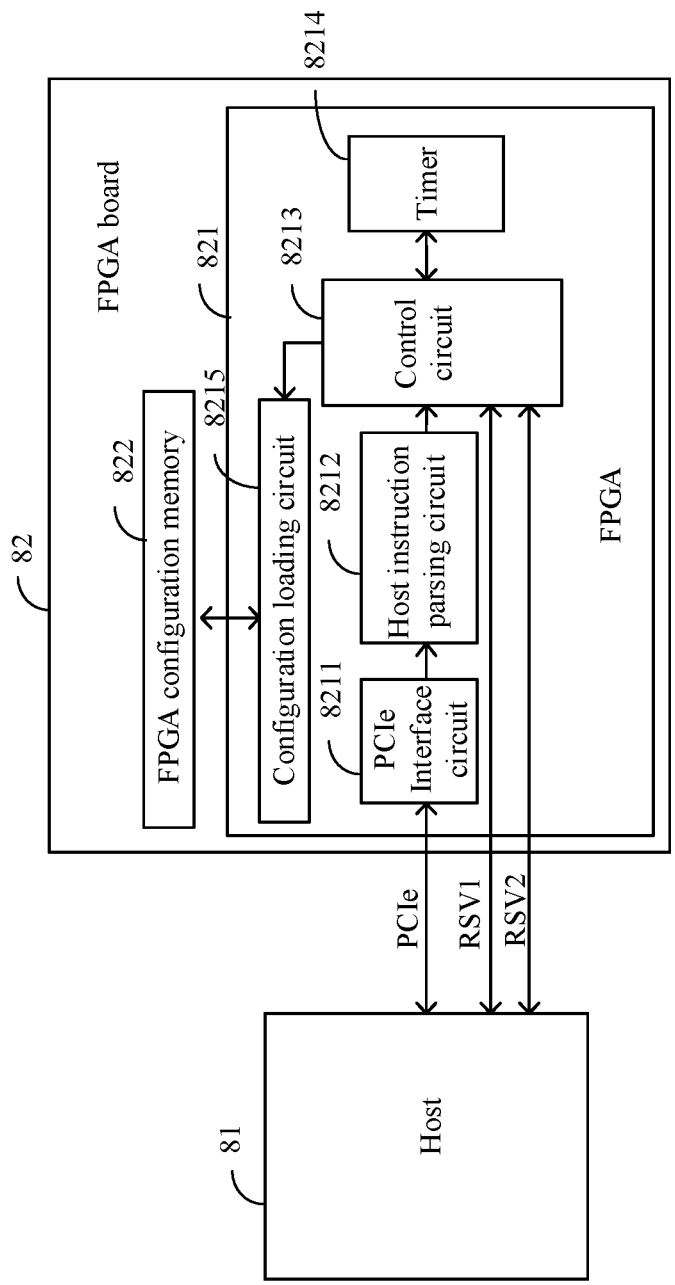
FIG. 9 is a schematic structural diagram of a host and an FPGA board of a computing device according to Embodiment 2 of this application.

Based on the foregoing embodiments, this embodiment discloses another FPGA upgrade method. FIG. 9 is a diagram of a hardware architecture in this embodiment. A difference between this embodiment and Embodiment 1 is that an FPGA and a host may not determine a status of the peer end by monitoring a PCIe link status change, but interact with each other through a reserved physical pin. The reserved pin may be two pins. One of the pins is used for communication from the host to the FPGA, and the other one is used for communication from the FPGA to the host. The reserved pin may alternatively be one pin supporting two-way communication, and the pin may be time-division multiplexed. In one embodiment, the pin is used for communication from the host to the FPGA at a moment, and communication from FPGA to the host at another moment. The following process is described based on two pins.

Some operations in this embodiment are similar to those in Embodiment 1. Unless otherwise specified, those skilled in the art may refer to related operations in Embodiment 1 to understand implementation of these operations.

Figure 10:
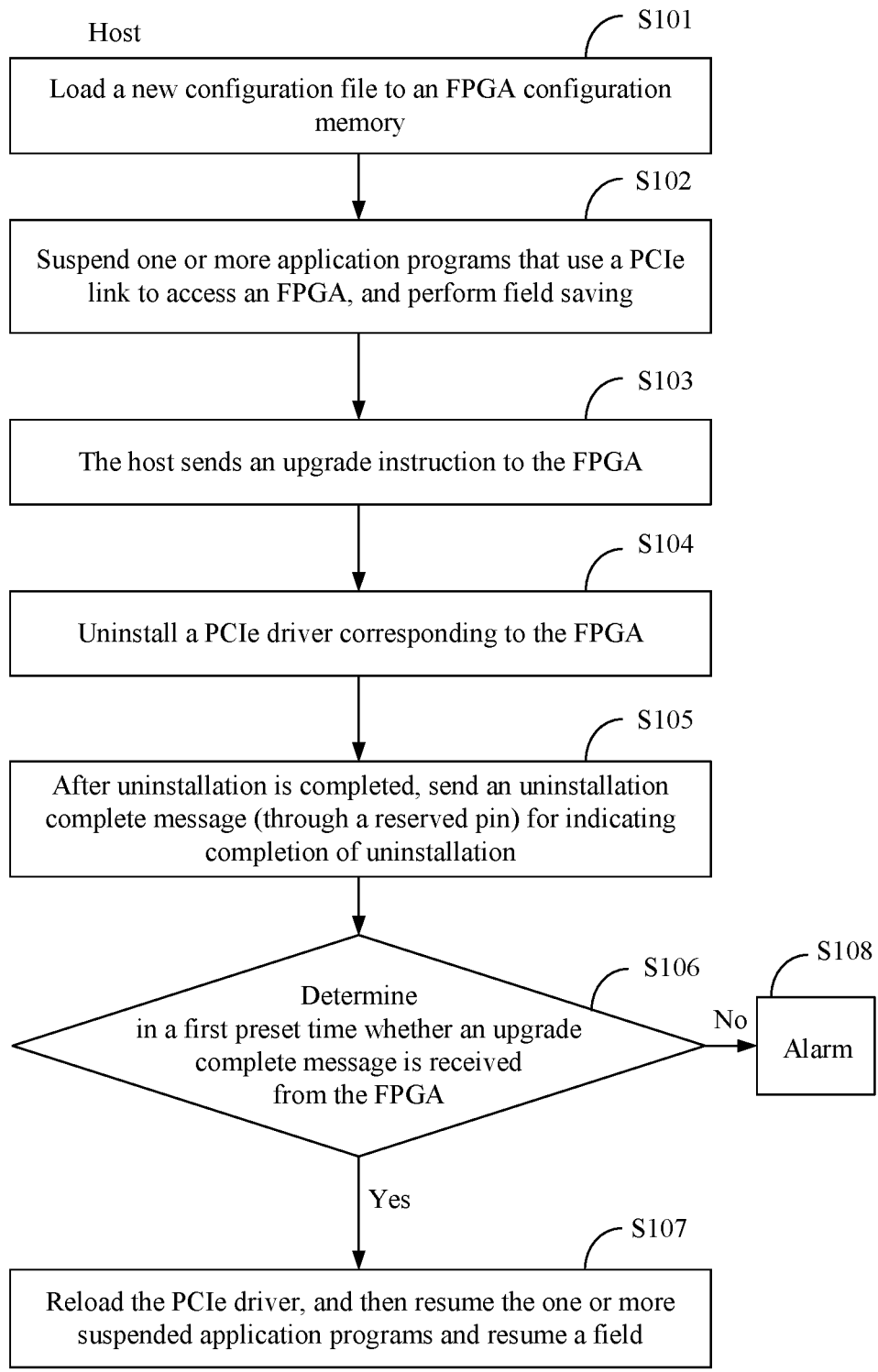
FIG. 10 is a flowchart of a method performed by a host according to Embodiment 2 of this application.

FIG. 10 is a flowchart of processing on a host side. Each operation is performed by the host. The following operations are included.

S101. Load new configuration data into an FPGA configuration memory.

S102. Suspend one or more application programs that use a PCIe link to access the FPGA, and perform field saving.

S103. Send an upgrade instruction to the FPGA.

In one embodiment, the upgrade instruction may be sent through a reserved RSV1 pin or the PCIe link.

S104. Uninstall a PCIe driver corresponding to the FPGA.

It should be noted that sequences of S102 and S103 are exchangeable.

That is, S103 may be performed before S102.

S105. After uninstallation is completed, send an uninstallation complete message for indicating completion of uninstallation.

In one embodiment, the uninstallation complete message is sent through the reserved pin (for example, RSV1). The uninstallation complete message is sent, so that the peer FPGA may be upgraded after receiving the message, thereby avoiding an abnormality of the host resulting from too early upgrade.

S106. Determine in a first expiration time whether an upgrade complete message indicating completion of upgrade is received from the FPGA; and if yes, perform S107, or if no, perform S108.

This operation is similar to operation S65 in Embodiment 1, and both are used to determine whether the peer end completes upgrade. A difference lies in that in this embodiment, the determining is performed by using a signal sent through the reserved pin, instead of using the status of the PCIe link. A principle of setting the first expiration time in operation S65 is the same as that of setting the first expiration time in this operation. Those skilled in the art may make adaptive adjustment based on detailed description of operation S65 (for example, subtracting a time for PCIe link status change). This is not described in detail in this operation.

After upgrade is successful, whether upgrade is successful may still be determined by using the method described in Embodiment 1, and corresponding measures are taken when it is determined that upgrade is successful or fails.

In this embodiment, instead of monitoring the status of the PCIe link in Embodiment 1, the host receives the upgrade complete message to know whether the FPGA completes upgrade. The upgrade complete message may be received through a reserved pin, for example, another reserved pin, RSV2. Certainly, if RSV1 is time-division multiplexed, the host may also use RSV1 to receive the upgrade complete message.

S107. Reload the PCIe driver, and then resume the one or more suspended application programs and resume a field.

S108. Issue an alarm.

Figure 11:
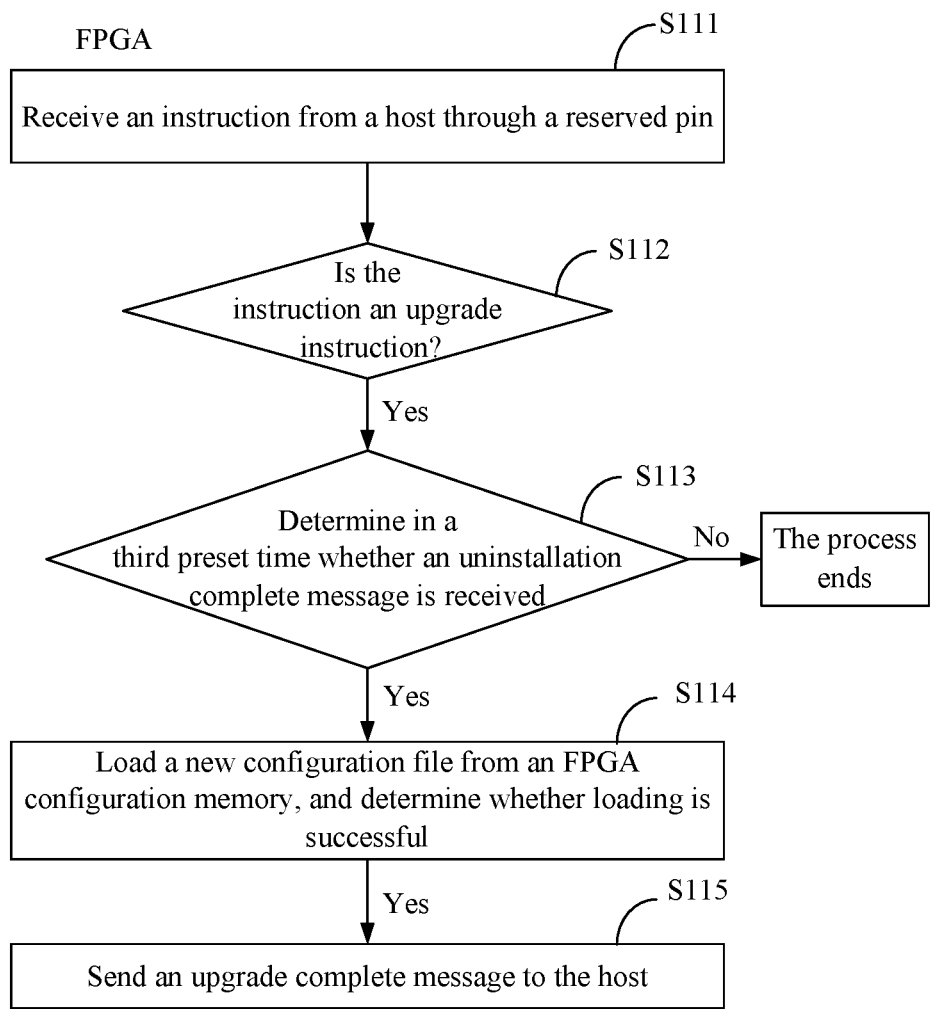
FIG. 11 is a flowchart of a method performed by an FPGA according to Embodiment 2 of this application.

FIG. 11 is a flowchart of processing on an FPGA side. Each operation is performed by the FPGA. The following operations are included.

S111. Receive an instruction from the host through a reserved pin.

S112. Determine whether the instruction is an upgrade instruction; and if yes, perform 113, or if no, perform another operation corresponding to the instruction.

S113. Determine in a second expiration time whether an uninstallation complete message is received; and if yes, perform S114, or if no, terminate the execution process, wait to receive an instruction, and proceed to S111 if the instruction is received.

For this operation, refer to operation S83 in Embodiment 1. For setting of the second expiration time in this operation, refer to the setting of the third expiration time in S83.

S114. Load new configuration data from an FPGA configuration memory, determine whether loading is successful; and if yes, perform S115, or if no, load a validated basic version as described in Embodiment 1 to ensure normal operation. After the configuration data is successfully loaded, the FPGA usually performs hot reset to complete tasks, for example, initializing an internal register of the FPGA.

S115. Send an upgrade complete message to the host, to terminate the process.

For example, the upgrade complete message may be sent to the host through RSV2, and this may be completed by a control circuit 8213.

In this embodiment, various information is sent by using dedicated hardware (the reserved pins), with no need to monitor the status of the PCIe link, thereby simplifying software implementation.

Embodiment 3

Based on Embodiment 2, this embodiment provides another FPGA upgrade method. In this embodiment, S102 in Embodiment 2 may be performed first, then S104 is performed, and then S103 is performed. Correspondingly, in this case, an FPGA does not need to wait for a preset time, but may directly start upgrade.

Methods performed separately by a host and the FPGA are described below.

Figure 12:
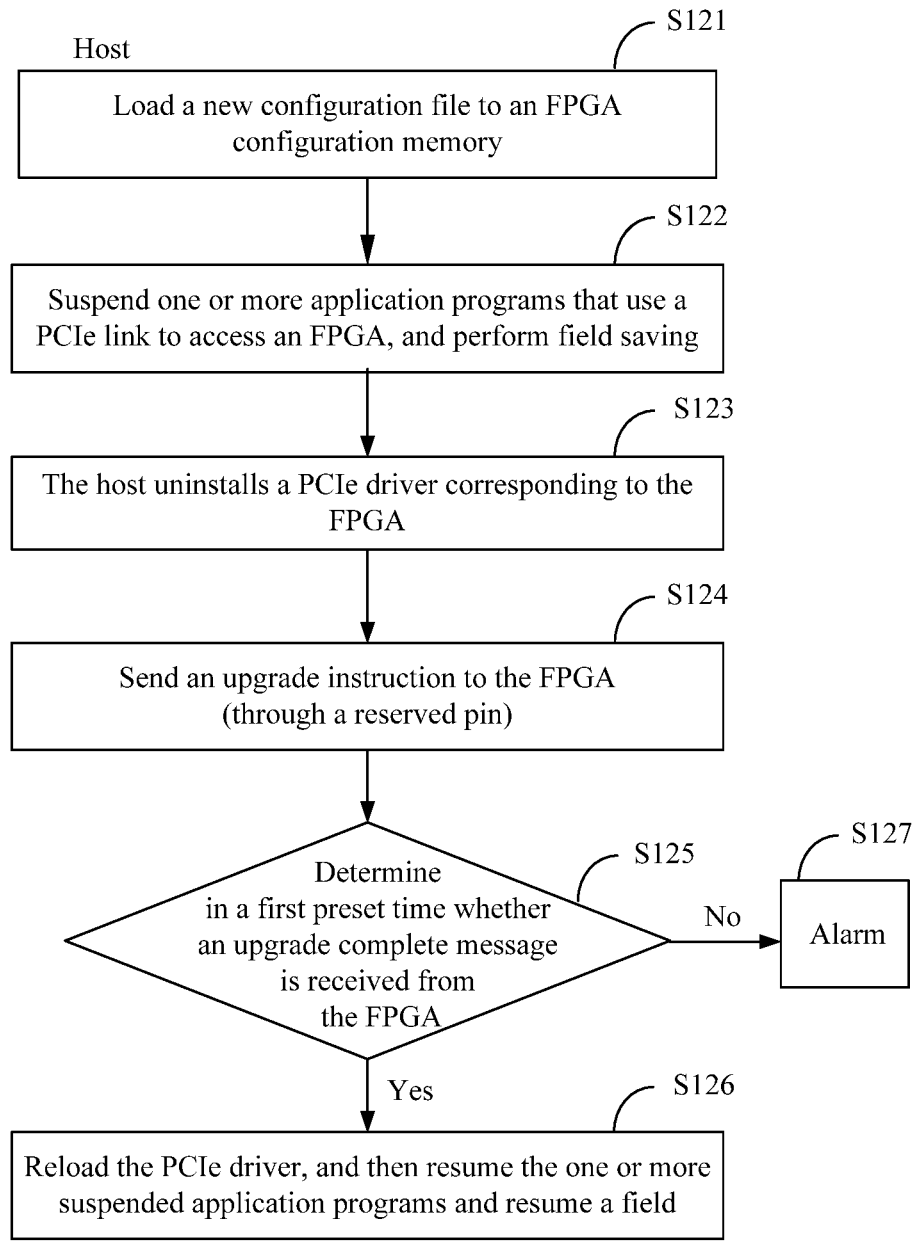
FIG. 12 is a flowchart of a method performed by a host according to Embodiment 3 of this application.

FIG. 12 is a flowchart of processing on a host side. Each operation is performed by the host. The following operations are included.

S121. Load new configuration data into an FPGA configuration memory.

S122. Suspend one or more application programs that use a PCIe link to access the FPGA, and perform field saving.

S123. Uninstall a PCIe driver corresponding to the FPGA.

S124. Send an upgrade instruction to the FPGA.

In this case, because the PCIe driver is uninstalled, the upgrade instruction cannot be sent through the PCIe link, and a reserved pin may be used instead.

S125. Determine in a first expiration time whether an upgrade complete message indicating completion of upgrade is received from the FPGA; and if yes, perform S126, or if no, perform S127.

S126. Reload the PCIe driver, and then resume the one or more suspended application programs and resume a field.

S127. Issue an alarm.

Figure 13:
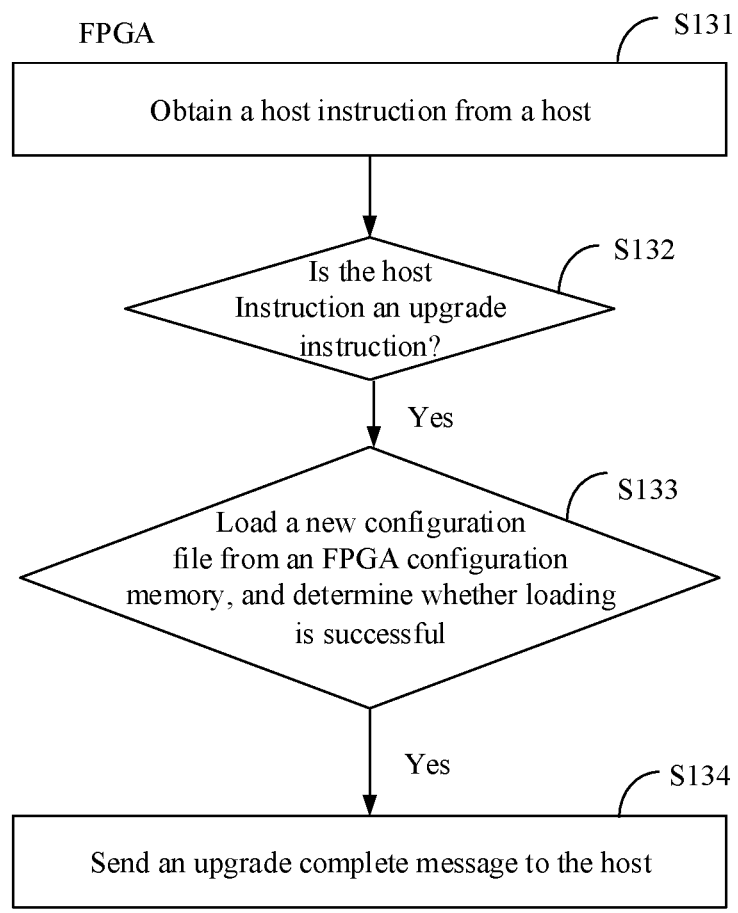
FIG. 13 is a flowchart of a method performed by an FPGA according to Embodiment 3 of this application.
Figure 14:
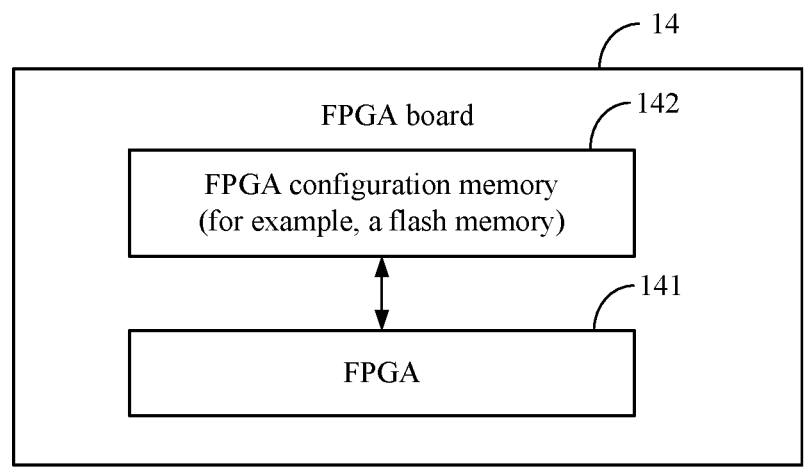
FIG. 14 is a schematic structural diagram of an FPGA board according to Embodiment 4 of this application.
Figure 15:
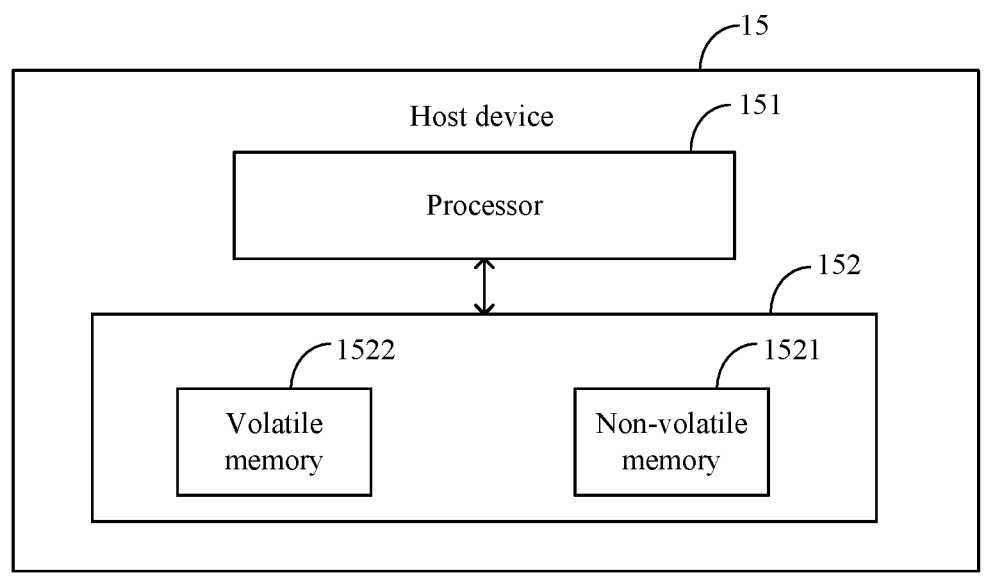
FIG. 15 is schematic structural diagram of a host device according to Embodiment 5 of this application.
Figure 16:
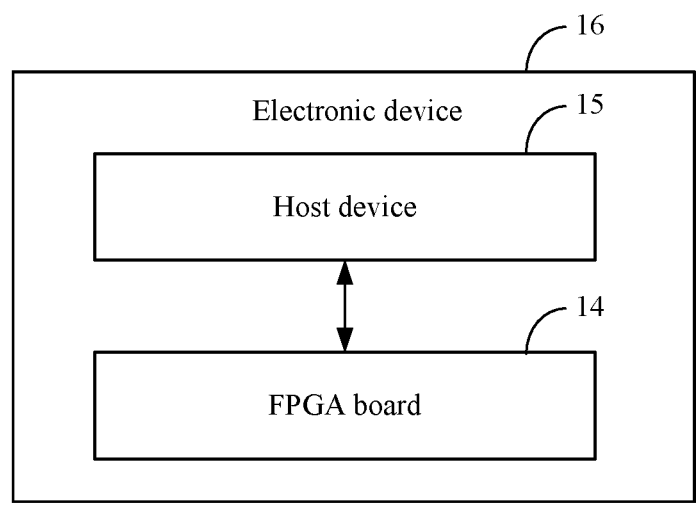
FIG. 16 is schematic structural diagram of an electronic device according to Embodiment 6 of this application.

FIG. 13 is a flowchart of processing on an FPGA side. Each operation is performed by an FPGA. The following operations are included.

S131. Receive an instruction from the host through a reserved pin.

S132. Determine whether the instruction is an upgrade instruction; and if yes, perform S133, or if no, perform another operation corresponding to the instruction.

S133. Load new configuration data from an FPGA configuration memory, determine whether loading is successful; and if yes, perform S134, or if no, load a validated basic version as described in Embodiment 1 to ensure normal operation.

S134. Send an upgrade complete message to the host, to terminate the process. In one embodiment, the upgrade complete message is sent to the host through a reserved pin (for example, RSV2).

In this embodiment, the host has already performed actions, for example, application suspension, field saving, and uninstallation of the PCIe driver. Therefore, the FPGA may be upgraded directly after receiving the upgrade instruction, thereby reducing a waiting time.

Embodiment 4

Based on the foregoing embodiments, this embodiment discloses an FPGA board 14. The FPGA board includes an FPGA chip 141 and an FPGA configuration memory 142. For the FPGA chip 141 and the FPGA configuration memory 142, refer to the previous description. Details are not repeated herein. In this embodiment, the FPGA 141 may be connected to a host in the manner described in Embodiment 1, that is, being connected through a PCIe link (excluding a reserved pin). In this embodiment, the FPGA loads configuration data stored in the FPGA configuration memory 142 to perform the operations performed by the FPGA 141 in Embodiment 1. It can be understood that a version loaded by the FPGA before upgrade is an old version, and after upgrade is completed, the old version is replaced with a new version (that is, new configuration data). Certainly, a part, used for implementing an upgrade function, in the old version may be kept in the new version, so as to perform upgrade later.

In another embodiment, the FPGA 141 and the host may be connected in the manner described in Embodiment 2, that is, being connected through a PCIe link, and are also connected through a reserved pin to transmit information such as an upgrade instruction and information used for indicating a working status. In this embodiment, the FPGA 141 loads configuration data stored in the FPGA configuration memory 142 to perform the operations performed by the FPGA 141 in Embodiments 2 and 3.

For a structure of the FPGA board, refer to the foregoing description. For example, the FPGA board may be a PCIe board inserted into a PCIe slot.

Embodiment 5

Based on the foregoing embodiments, this embodiment discloses a host device 15. The host device 15 may be the foregoing computing device or a host of other data processing devices. The host device 15 includes a processor 151 (for example, a CPU) capable of executing a software instruction and a memory 152. The memory 152 may include a non-volatile memory 1521 (for example, a magnetic disk or a flash memory) and a volatile memory 1522 (for example, an internal memory). Through cooperation of the processor 151 and the memory 152, the processor 151 may execute an instruction stored in the memory and complete the operations performed by the host in the foregoing embodiments.

Embodiment 6

Based on the foregoing embodiments, this embodiment discloses an electronic device 16. The electronic device 16 includes the FPGA board described in Embodiment 4 and the host device described in Embodiment 5. The electronic device may be the foregoing computing device or other data processing devices.

Embodiment 7

Based on the foregoing embodiments, this embodiment discloses a computer storage medium. The computer storage medium stores a plurality of instructions to be executed by a processor. These instructions are instructions that are to be read by the processor and that enable the processor to perform the operations performed by the host in the foregoing embodiments.

Based on the foregoing embodiments, this embodiment further discloses a computer storage medium. The computer storage medium stores configuration data used for configuring an FPGA. The configuration data is configuration data that are to be loaded by the FPGA and enable the FPGA to perform the operations performed by the FPGA in the foregoing embodiments.

It should be noted that modifiers such as "first", "second", and "third" in this application are used only for a distinguishing purpose in a case in which a same noun is used in different scenarios, and neither represent a strict order nor have the same meaning as the terms "first" and "second" in the claims. A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), or a random access memory (RAM).

In the foregoing better embodiments, the objective, technical solutions, and advantage of the present application are further described in detail. The foregoing descriptions are merely better embodiments of the present application, but are not intended to limit the present application. Any modification, equivalent replacement, or improvement made without departing from the spirit and principle of the present application shall fall within the protection scope of the present application.

What is claimed is:

1. A field programmable logic gate array (FPGA) upgrade method performed by an FPGA, wherein the FPGA communicates with a host through a peripheral component interconnect express (PCIe) link, the FPGA is further connected to an FPGA configuration memory, and the FPGA configuration memory stores configuration data required for upgrading the FPGA, wherein the method comprises:
receiving an upgrade instruction delivered by the host;
continuously monitoring in an expiration time whether a status of the PCIe link is changed to link down, wherein link down is a status of the PCIe link after the host uninstalls a PCIe driver corresponding to the FPGA;
wherein, if detected in the expiration time that the PCIe link is changed to link down, loading the configuration data from the FPGA configuration memory for upgrade; and
after upgrade is completed, negotiating with the FPGA to restore the status of the PCIe link to link up, wherein link up is used for reloading the PCIe driver upon detection by the host.

2. The method according to claim 1, wherein link down is a status of the PCIe link after the host first suspends one or more application programs and then uninstalls the PCIe driver corresponding to the FPGA, and the one or more application programs are one or more application programs that use a PCIe link to access the FPGA.

3. The method according to claim 2, wherein link up is further used to resume operation of the one or more application programs after the host detects link up and reloads the PCIe driver.

4. The method according to claim 1, wherein the expiration time is a predetermined time required by the host to complete uninstallation of the PCIe driver after delivering the upgrade instruction.

5. The method according to claim 1, wherein the continuously monitoring in an expiration time whether a status of the PCIe link is changed to link down comprises:
continuously monitoring, in the expiration time, a link status register located in the FPGA, so as to continuously monitor whether the PCIe link is changed to link down.

6. The method according to claim 1, wherein an upgrade process exits if the status of the PCIe link is not changed to link down in the expiration time.

7. A field programmable logic gate array (FPGA) upgrade method performed by a host, the host is connected to an FPGA through a peripheral component interconnect express (PCIe) link, the FPGA is connected to an FPGA configuration memory, and the FPGA configuration memory stores configuration data required for upgrading the FPGA, wherein the method comprises:
delivering, by the host, an upgrade instruction to the FPGA;
uninstalling a PCIe driver corresponding to the FPGA, so that a status of the PCIe link is changed to link down;
continuously monitoring in a first expiration time whether the status of the PCIe link is changed to link up; and
reloading the PCIe driver if detected that the status of the PCIe link is changed to link up, wherein,
the upgrade instruction is an instruction that enables the FPGA to perform the following operations upon reception:
continuously monitoring in a second expiration time whether the status of the PCIe link is changed to link down, wherein link down is a status of the PCIe link after the host uninstalls the PCIe driver corresponding to the FPGA;
wherein, if detected in the second expiration time that the PCIe link is changed to link down, loading the configuration data from the FPGA configuration memory for upgrade; and
after upgrade is completed, negotiating with the host to restore the status of the PCIe link to link up used for reloading the PCIe driver upon detection by the host.

8. The method according to claim 7, further comprising:
before the uninstalling the PCIe driver, suspending one or more application programs that use a PCIe link to access the FPGA.

9. The method according to claim 8, further comprising: after the reloading the PCIe driver, resuming operation of the one or more application programs.

10. The method according to claim 7, wherein the continuously monitoring in a first expiration time whether the status of the PCIe link is changed to link up comprises:
continuously monitoring, in the first expiration time, a link status register located in the host, so as to continuously monitor whether the PCIe link is changed to link up.

11. The method according to claim 7, wherein the first expiration time is a predetermined time required by the FPGA to complete upgrade.

12. A field programmable logic gate array (FPGA) board comprising an FPGA and an FPGA configuration memory, wherein the FPGA performs a method of upgrading the FPGA by loading configuration data stored in the FPGA configuration memory, wherein the method comprises:
receiving an upgrade instruction delivered by a host;
continuously monitoring in an expiration time whether a status of a peripheral component interconnect express (PCIe) link is changed to link down, wherein link down is a status of the PCIe link after the host uninstalls a PCIe driver corresponding to the FPGA;
wherein, if detected in the expiration time that the PCIe link is changed to link down, loading the configuration data from the FPGA configuration memory for upgrade; and
after upgrade is completed, negotiating with the FPGA to restore the status of the PCIe link to link up, wherein link up is used for reloading the PCIe driver upon detection by the host.

13. The FPGA board according to claim 12, wherein link down is a status of the PCIe link after the host first suspends one or more application programs and then uninstalls the PCIe driver corresponding to the FPGA, and the one or more application programs are one or more application programs that use a PCIe link to access the FPGA.

14. The FPGA board according to claim 13, wherein link up is further used to resume operation of the one or more application programs after the host detects link up and reloads the PCIe driver.

15. The FPGA board according to claim 12, wherein the expiration time is a predetermined time required by the host to complete uninstallation of the PCIe driver after delivering the upgrade instruction.

16. The FPGA board according to claim 12, wherein an upgrade process exits if the status of the PCIe link is not changed to link down in the expiration time.

17. A host device connected to a field programmable logic gate array (FPGA) through a peripheral component interconnect express (PCIe) link, the FPGA is connected to an FPGA configuration memory, and the FPGA configuration memory stores configuration data required for upgrading the FPGA, the host device comprising:
a processor; and
a memory, wherein the processor is configured to perform an instruction stored in the memory to implement a method of upgrading the FPGA, wherein the method comprises:
delivering an upgrade instruction to the FPGA;
uninstalling a PCIe driver corresponding to the FPGA, so that a status of the PCIe link is changed to link down;
continuously monitoring in a first expiration time whether the status of the PCIe link is changed to link up; and
reloading the PCIe driver if detected that the status of the PCIe link is changed to link up, wherein,
the upgrade instruction is an instruction that enables the FPGA to perform the following operations upon reception:
continuously monitoring in a second expiration time whether the status of the PCIe link is changed to link down, wherein link down is a status of the PCIe link after the host device uninstalls the PCIe driver corresponding to the FPGA;
if detected in the second expiration time that the PCIe link is changed to link down, loading the configuration data from the FPGA configuration memory for upgrade; and
after upgrade is completed, negotiating with the host device to restore the status of the PCIe link to link up that is used for reloading the PCIe driver upon detection by the host device.

18. The host device according to claim 17, the method further comprising:
before the uninstalling the PCIe driver, suspending one or more application programs that use a PCIe link to access the FPGA.

19. The host device according to claim 18, the method further comprising: after the reloading the PCIe driver, resuming operation of the one or more application programs.

20. The host device according to claim 17, wherein the first expiration time is a predetermined time required by the FPGA to complete upgrade.

* * * * *